United States Patent Office 2,981,717
Patented Apr. 25, 1961

2,981,717
POLY OLEFINS STABILIZED WITH SALTS OR AMIDES OF A THIODIALKANOIC ACID

Thomas H. Boultbee, Sale, England, assignor to Shell Oil Company, a corporation of Delaware
No Drawing. Filed Jan. 16, 1959, Ser. No. 787,114
Claims priority, application Great Britain Jan. 31, 1958
6 Claims. (Cl. 260—45.85)

This invention relates to stabilized polymers of mono-alpha-olefins. More particularly it relates to stabilized compositions and methods for stabilizing polymers of alpha-olefins prepared at low temperatures and pressures.

It is now well known that polymers of mono-alpha-olefins may be prepared at low temperatures and pressures in the presence of certain catalyst compositions which are commonly referred to as "Ziegler catalysts" or "low-pressure catalyst." These catalysts may be briefly described as comprising the reaction product of at least one compound of a metal of group IV—VI of the periodic table with at least one of the following: (A) aluminum trialkyl, (B) a compound of the formula $R_1R_2AlX$ wherein $R_1$ and $R_2$ are selected from the group consisting of hydrogen and hydrocarbons and X is selected from the group consisting of hydrogen, halogen, alkoxy, aryloxy, the residue of a secondary amine, secondary acid amine, mercaptan, diphenol, carboxylic acid and sulfonic acid, (C) an organo zinc compound, and (D) an organo-magnesium compound. The composition prepared from a compound of the formula $R_1R_2AlX$ in which $R_1$ and $R_2$ are selected from the group consisting of hydrogen and hydrocarbon and X is a halogen with a metal selected from the group consisting of metal from the group VIII of the periodic table or manganese may also be used. Low pressure polymers of alpha-olefins may also be obtained with a catalyst composition comprising the reaction product aluminum trichloride, titanium tetrachloride and aluminum powder. Still other catalyst compositions are known for the production of polymers of alpha-olefins at low temperatures and pressures but the nature of the catalyst composition is not the important feature of the stabilized compositions of this invention, as long as the polymers are linear or crystalline.

It is an object of this invention to provide novel compositions of polymers of mono-alpha-olefins. It is another object of this invention to provide stabilized compositions of polymer of alpha-olefins. It is a further object of this invention to provide polymers of alpha-olefins which have color stability and which have improved resistance to oxidation. It is yet another object of this invention to provide methods for stabilizing linear or crystalline polyethylene and polypropylene. It is still another object of the present invention to prevent, or at least appreciably reduce, the tendency of the polyolefins to degrade during processing (e.g. milling or molding) operations such as are carried out during the manufacture of articles therefrom and also during the subsequent lifetime of such articles.

While this invention applies equally to polymers of mono-alpha-olefins for the sake of convenience, the description of the invention is directed mainly to polyethylene.

The linear polyethylene, prepared by the low-pressure processes tend to degrade and discolor on exposure to light and on being subjected to elevated temperatures, i.e. temperatures above 100° C. A number of compounds have been proposed as additives to impart resistance to degradation under the conditions indicated. In the case of polyethylene, polypropylene and other low-pressure polymers of mono-alpha-olefins, an appreciable number of these known additives have been found to be useful to reduce degradation but many of them have a concomitant adverse effect, that is of causing a marked color formation or "staining." Thus when such additives are added to the linear polyethylene, there is often produced discoloration which may develop immediately during the admixing of the additives or subsequently during milling or molding at elevated temperatures. It is at present considered that this may be due, in part, to traces of catalyst residues in the polymer, such as traces of aluminum or titanium compounds, which in themselves are not deleterious to the normal properties of the polyolefins but which are sufficient to cause staining with conventional anti-oxidants to an objectionable extent.

Thus it has been found that most of the anti-oxidants which are quite satisfactory for use with polyethylene produced by the high pressure process produce this pronounced discoloration when used in polymeric materials based upon the low-pressure polyethylene, and are thus of no commercial utility as anti-oxidants for low-pressure polyolefins.

According to the present invention, a normally solid polymer of a mono-alpha-olefin is stabilized by the addition of a small proportion of an additive which is a salt or an amide of a thiodialkanoic acid. The thiodialkanoic acid has the formula:

$$S\begin{matrix}C_nH_{2n}COOH \\ C_mH_{2m}COOH\end{matrix}$$

where $m$ and $n$ are the same or different positive whole numbers and the salts thereof are the alkali metal, alkaline earth metal, ammonium, or amine salts with the first being particularly preferred. Examples of such acids in which $m=n$ are thiodiacetic acid, thiodipropionic acid, thiodi-n-butyric acid and 2-thia-pentane dicarboxylic acid. It is possible that either or both of the carboxyl groups of the thiodialkanoic acid may be utilized in salt or amide formation. Thus it is possible for the thiodialkanoic acid molecule to carry non-interfering substituents, as for example alkyl or cycloalkyl radicals. Examples of suitable derivatives of thiodialkanoic acids such as thiodipropionic acid for use in forming polymeric composition in accordance with the present invention include the mono- and di-salts of metals such as sodium, potassium, calcium, barium, strontium, magnesium, ammonium and amines such as primary amines, for example, methyl amine, ethyl amine and propyl amine; secondary amines as for example, dimethyl amine and diethyl amine; tertiary amines as for example trimethyl amine and triethyl amine; and also the amides for example, thiodipropionamide and thiodipropiondiamide. It will be noted that some of the metal salts have a pronounced inherent color and those salts should be avoided. The preferred amine salts are the salts of aliphatic amines and preferably the stabilizers should be free or harmful impurities as contaminating mercaptans.

Various methods for preparing the thiodialkanoic salts or amides have been disclosed in the prior art. For example, Beilstein, vol. 3, page 300, described two methods for preparing thiodipropionic acid. The acid may be prepared by the introduction of 2 mole percent beta-iodopropionic acid in concentrated solution of 1 mole percent sodium sulfide or alternatively by introduction of beta-iodopropionic acid on an alkali hydrosulfide in addition to thio-hydroacrylic acid.

Still another method is disclosed by Kost Lebedev and Yashunskii in the Vestnic of Moscow University, volume 8, No. 3 (1953). In that method one mole of a sodium sulfide solution, $Na_2S.9H_2O$, is added dropwise to two moles of vinyl cyanide, $CH_2=CHCN$, at 15 to 17° C. with stirring for 4 hours at room temperature. This results in an oily layer which is extracted with benzene, washed, dried, and distilled to yield 83 to 86 percent β,β'- dicyanodiethyl sulfide. The sulfide is refluxed for 4 hours with 100 millimeters of concentrated hydrochloric acid to obtain a 90% yield of β,β'-thiodipropionic acid. Similar methods are available for the preparation of the other thiodialkanoic acids.

The salts of the thiodialkanoic acid may be prepared by reacting the acid with an alkali metal base such as sodium hydroxide or sodium carbonate to form the salt or they may be prepared in situ. The in situ preparation is accomplished by incorporating in the polyolefin either simultaneously or successively both the free thiodialkanoic acid and a base which will react with the acid to form the required salt such as an alkali metal carbonate and alkaline earth metal oxide or an amine. In some cases it may be advantageous to add more than the stoichiometric amount of the base so as to provide some residual alkalinity in the polymeric material. Thus it has been found that the presence of an alkali metal or an alkaline earth metal salt of thiodipropionic acid in up to 0.75%, by weight of the polymer, of the corresponding metal carbonate or oxide in excess of the stoichiometric amount acquired for the reaction with acid is particularly useful for polyethylene molding compositions.

Up to about 5% and usually up to 1.0% of the thiodialkanoic salt or amide by weight of the low-pressure polymer will be sufficient in carrying out the present invention and more advantageously the amount of additives should be between 0.01 and 0.5%, by weight of the polymer.

Preferred additives in accordance with the invention are the metal salts of thiodialkanoic acids of the above formula where the sum $m+n$ ranges from 1 to 9 and preferably between 1 and 4. In other words, the acid should contain no more than 11 carbon atoms and preferably less than 7. Mixtures of two or more additives as defined above may be present in the polymeric materials of the present invention, if desired. It will be understood that the polymer composition may include other components, for example, rubber, for modifying the inherent properties of the polyolefinic compound. The thiodialkanoic additives defined herein can also be used in conjunction with other additives such as cadmium and calcium stearates, polyglycidyl polyethers and alkyl tin esters. Dyes, pigments, lubricants, and anti-static agents may also be present in the composition.

These additives employed in the present invention are extremely useful in all low-pressure polymers of mono-alpha-olefin. They are especially useful for the polymers prepared from mono-alpha-olefins having from 2 to 8 carbon atoms. Preferred additives in the present invention are the sodium salts of thiodipropionic acid and thiodibutyric acid, though their other alkali metal and alkaline earth metal salts can also be used if desired. These additives are particularly effective in arresting degradation and discolorization of low-pressure polyethylene and polypropylene at elevated temperatures and also in preventing degradation of the polymer on prolonged exposure to light.

The methods of stabilizing polymers of alpha-olefins of this invention are fully operable irrespective of the practices and techniques used to polymerize the alpha-olefin. Briefly, the low-pressure processes comprise polymerizing a mono-alpha-olefin with catalysts of the type previously described. The polymerization is conducted at temperatures ranging from room temperature to about 150° C. or higher and pressure ranging from atmospheric to about 500 p.s.i. After the polymerization is complete, the polymer is worked up and treated to separate or reduce the catalyst residues. In addition to these steps it is common to perform operations during or after the polymerization in order to obtain some advantage as increased yields per unit of catalyst, higher purity and the like. It will be seen that this invention is fully operable regardless of the various techniques for preparing the polymer itself.

The present invention is illustrated by the following:

EXAMPLE I

Low-pressure polyethylene, prepared with a catalyst of aluminum triethyl and titanium tetrachloride, is formed into sheets by milling the polyethylene for 1 hour on a 2-roll mill with a mill surface temperature of approximately 160° C. and subsequently pressing the sheeted material in a press which is heated to about 150° C. The polyethylene sheets each contain different anti-oxidants admixed within the sheet. Table I shows the results of using the additives in accordance with the present invention and Table II illustrates the effect of certain conventional prior art anti-oxidants. The figures for color rating were obtained in a standard reflectivity test and are based on a rating of 100 for a standard white disc. The polyethylene used as the standard had a color rating of 85 on this scale before the addition of an anti-oxidant. The intrinsic viscosity (I.V.) was determined as a 0.1% solution in decalin at 120° C. The melt index (M.I.) of the polyethylene prior to processing was 2.25. Both the I.V. and the M.I. of the composition after hot rolling provides an indication of the degree of degradation, if any, which has taken place.

*Table I*

| Anti-oxidant | Percent by weight of anti-oxidant | Polymeric Material ||||||
|---|---|---|---|---|---|---|---|
| | | Before milling ||| After milling |||
| | | I.V. | Color | M.I. | I.V. | Color | M.I. |
| None | | 2.25 | 85 | 0.34 | 1.83 | 77 | 0.14 |
| Thiodipropionic acid+0.2% sodium carbonate | 0.1 | 1.77 | 86 | 0.40 | 1.88 | 81 | 0.37 |
| Thiodipropionic acid+0.2% calcium thiodipropionate | 0.1 | 2.13 | 78 | 0.35 | 1.71 | 66 | 0.41 |
| Thiodipropionic acid+0.2% sodium thiodipropionate | 0.1 | | 80 | 0.37 | | 76 | 0.25 |
| Thiodiacetodiamide | 0.1 | 1.82 | 84 | 0.38 | 1.77 | 80 | 0.35 |
| Strontium thiodibutyrate | 0.1 | 1.70 | 83 | 0.36 | 1.75 | 79 | 0.33 |

*Table II*

| Anti-oxidant | Percent by weight of anti-oxidant | Polymeric material ||||||
|---|---|---|---|---|---|---|---|
| | | Before milling ||| After milling |||
| | | I.V. | Color | M.I. | I.V. | Color | M.I. |
| 2,2'-methylene-bis-(4-methyl-6-tert butyl phenol) | 0.1 | | [1] 71 | | | 62 | |
| 4,4' thiobis (3-methyl-6-tert butyl phenol) | 0.1 | | [1] 44 | | | 46 | |
| Oxycresyl camphane | 0.1 | | [1] 67 | | | 50 | |

[1] Discoloration occurred on mixing in the conventional anti-oxidant, i.e. even before hot milling.

The results show that the color retention was approximately 95% with thiodipropionic acid and 2% sodium carbonate whereas the best of the prior art anti-oxidant shown, 2,2′methylene-bis-(4-methyl-6-tert-butyl phenol) shows only a 73% color retention.

In a series of test using sheets of polypropylene and a copolymer of propylene and butene-1, similar improvements are noted. However, in these cases the anti-oxidant was used in an amount of .15%, by weight.

Other additives disclosed in the present invention may readily be used also to obtain the advantages described. Mixtures of additives and combinations of the additives of the present invention with other additives as mentioned hereinbefore may also be used.

I claim as my invention:

1. A composition comprising a solid polymer of a mono-alpha-olefin containing metallic residues from an organo aluminum compound and less than about 5%, by weight, of a derivative of thiodialkanoic acid having the formula

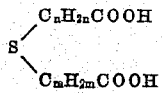

wherein numbers $m+n$ range from 1 to 9, said derivative being selected from the group consisting of alkali metal salts, alkaline earth metal salts, ammonium salts, salts of aliphatic amines and unsubstituted amides thereof.

2. The composition of claim 1 in which the polymer is polyethylene.

3. The composition of claim 1 in which the polymer is polypropylene.

4. The composition of claim 1 in which $m=n=2$.

5. The composition of claim 1 in which the percentage of the compound is between about 0.05 and about 1.0% by weight of the polymer.

6. The composition of claim 1 in which the salt is the calcium salt of thiodipropionic acid.

References Cited in the file of this patent
UNITED STATES PATENTS

| | | |
|---|---|---|
| 2,519,755 | Gribbins | Aug. 22, 1950 |
| 2,737,525 | Mulvaney et al. | Mar. 6, 1956 |